United States Patent

[11] 3,630,765

| [72] | Inventor | Roger J. Araujo<br>Corning, N.Y. |
|---|---|---|
| [21] | Appl. No. | 801,562 |
| [22] | Filed | Feb. 24, 1969 |
| [45] | Patented | Dec. 28, 1971 |
| [73] | Assignee | Corning Glass Works<br>Corning, N.Y. |

[54] PHOTOCHROMIC GLASS CONTAINING TANTALUM OXIDE FOR OPTICAL FIBER FABRICATION
3 Claims, 1 Drawing Fig.

| [52] | U.S. Cl. | 106/54, 106/DIG. 6, 106/50, 106/47 Q |
|---|---|---|
| [51] | Int. Cl. | C03c 3/04 |
| [50] | Field of Search | 106/54, 39, 47 Q, 50, DIG. 6; 65/33 |

[56] References Cited
UNITED STATES PATENTS

| 3,197,296 | 7/1965 | Eppler et al. | 65/33 |
|---|---|---|---|
| 3,208,860 | 9/1965 | Armistead et al. | 106/54 |
| 3,293,052 | 12/1966 | Sanchuk et al. | 106/54 |
| 3,328,182 | 6/1967 | Araujo et al. | 106/54 |
| 3,460,954 | 8/1969 | Young | 106/54 |

*Primary Examiner*—Tobias E. Levow
*Assistant Examiner*—W. R. Satterfield
*Attorneys*—Clarence R. Patty, Jr. and Clinton S. Janes, Jr.

ABSTRACT: This invention relates to photochromic glass compositions containing about 10–50 percent by weight $Ta_2O_5$ which have refractive indices higher than about 1.52, and, preferably, higher than about 1.58, thereby rendering them especially suitable as a core glass in the production of photochromic optical fibers.

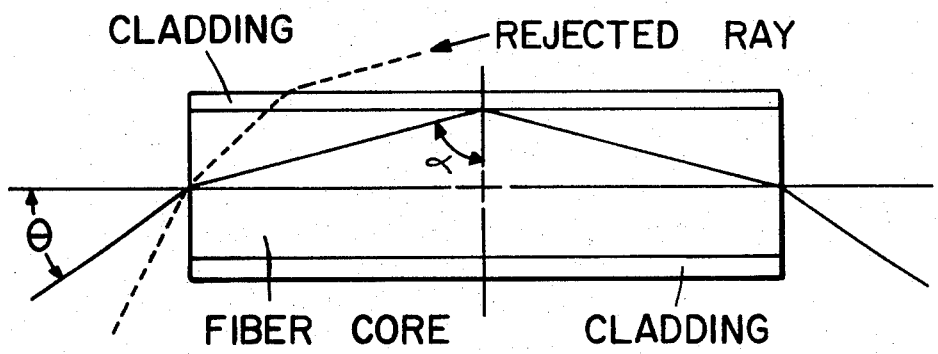

PHOTOCHROMIC GLASS CONTAINING TANTALUM OXIDE FOR OPTICAL FIBER FABRICATION

Fiber optics is a branch of optics which makes use of the phenomenon of total internal reflection whereby light is transmitted through an optically transparent fiber. This phenomenon, when combined with the ready capability of forming individual fibers into flexible fiber bundles, has provided manifold uses therefor including cathode-ray tube faceplates, image intensifiers, and image dissectors. A light pipe or fiber comprises a core glass of a relatively high index of refraction which is enveloped by another glass having a lower index of refraction. This fiber, then, traps light within a defined critical angle ($\theta$) and, because of total internal reflection, transmits the light down the fiber to be emitted from the output end at the same angle as it entered. This light is not transmitted through the enveloping or cladding glass inasmuch as the angle of incidence on the walls is greater than the critical angle ($\alpha$) necessary for total reflection. The critical angle of acceptance ($\theta$) and the numerical aperture (NA) of the fiber will depend upon the refractive indices of the core and cladding glasses. Numerical aperture defines the maximum acceptance angle at which the fiber can trap and reflect light. Therefore, the numerical aperture is a measure of a fiber optic's light-gathering power and, being expressed as the sine of the acceptance angle, is a function of the refractive indices of the fiber's core and cladding glasses. Hence, $$NA = n_e \sin \theta = \sqrt{n_1^2 - n_2^2}$$

wherein $n_e$ is the refractive index of the medium at the entrance of the fiber (with air this value is 1), $n_1$ is the refractive index of the core glass, and $n_2$ is the refractive index of the cladding glass. A diagrammatic sketch representing this description is appended to this specification.

It will be apparent from a study of this diagrammatic sketch that, the greater the numerical aperture a particular optical fiber possesses, the greater will be the acceptance angle at which the fiber can trap and reflect light. And, since NA is a function of the refractive indices of the core and cladding materials, it is generally true that the greater the difference between the refractive indices of the core and cladding material, the greater will be the NA and, therefore, the more advantageous will be the product. This is especially true since high NA gives better resolution.

The mechanics and theoretical considerations involved in the field of fiber optics have been studied extensively in the literature, so further explanation herein is not deemed necessary. One well-recognized discussion of this subject can be found in Appendix N of the book "Concepts of Classical Optics" by John Strong, published in 1958. Each fiber acts to transmit a single point source so, in general, the resolution of the total image is dependent upon the number of fibers per unit bundle cross-sectional area, the larger the number of fibers per unit area the greater the image resolution at the exit area end.

In various information display devices, such as cathode-ray tube faceplates, it would be highly desirable to employ a glass having a memory. Thus, the glass should possess read, write, and erase possibilities. A photochromic glass is one wherein the color thereof can be changed upon exposure to radiations of certain wavelengths and the original color returned thereto when the actinic radiation is removed and/or the glass is exposed to radiations of different wavelengths. It can be appreciated that this property of photochromic glass strongly suggests its possible utility in memory devices. Nevertheless, while, in principle, all that is required for producing photochromic optical fibers is a high refractive index photochromic glass clad with a glass of lower refractive index, specific photochromic properties are necessary for specific applications. Hence, in information display devices, it would be desirable for the glass to be darkened (the color changed) by exposure to one kind of radiation, say ultraviolet radiation, and, the darkening erased by another kind of radiation, say red or infrared radiation. The information contained in the glass must persist therein for reasonable times while the glass is being read by some radiation of neutral wavelength, say visible light. This persistence of information requires that the natural fading rate of the glass at the temperature at which it will be used (normally room temperature) is low, the thermal facing rate at somewhat elevated temperatures is low, and that the glass be neither substantially darkened nor bleached by some neutral wavelength of radiation.

U.S. Pat. No. 3,208,860 comprises the basic disclosure concerning photochromic or phototropic glasses, as they have been variously termed. That patent describes glass compositions containing crystals of silver halides dispersed in a glass matrix, which crystals darken when exposed to ultraviolet radiations and return to their original state when the ultraviolet radiation is removed. This phenomenon displayed by these crystals imparts to the glass the characteristic of reversible darkening dependent upon the amount of actinic radiation incident thereon. This reversibility of optical density was found to be free from fatigue, i.e., the darkening and fading could be undertaken indefinitely with essentially no loss in degree and rate of the reaction between the crystals and the incident radiation.

Whereas U.S. Pat. No. 3,208,860 discloses that any glass containing crystals of silver chloride and/or silver bromide and/or silver iodide will exhibit some photochromic behavior, that patent also points out that the character of this behavior is dependent upon the overall composition of the glass and cites the following preferred ranges of ingredients: 40–76% $SiO_2$, 4–26% $Al_2O_3$, 4–26% $B_2O_3$, at least one alkali metal oxide selected from the group consisting of 2–8% $Li_2O$, 4–15% $Na_2O$, 6–20% $K_2O$, 8–25% $Rb_2O$, and 10–30% $Cs_2O$, at least one halogen in the indicated minimum effective proportion of 0.2% chlorine, 0.1% bromine, and 0.08% iodine, and a minimum of silver in the indicated proportion of 0.2% in a glass wherein the effective halogen is chlorine, 0.05% in a glass containing at least 0.1% bromine but containing less than 0.08% iodine, and 0.03% in a glass which contains at least 0.08% iodine.

I also have discovered that the effects of batch component changes are complicated functions of the total glass composition, but several observations can be made which are, in the main, accurate.

First, the quantities of alkali metal oxides, boron oxide, silver, and the halogens are of prime importance and the amount of alumina also exerts some influence.

Second, increasing the total alkali metal oxide content or reducing the boron oxide content causes a slowing of the thermal fading rate.

Third, replacing soda with lithia results in an increase in the rate of thermal fading.

Fourth, replacing soda with potassia has no substantial effect on photochromic behavior.

Fifth, the addition of fluoride improves the meltability of the glass but also increases the rate of thermal fading and decreases the efficiency of long wavelength bleaching. However, these effects may be tolerable if the fluoride additions do not exceed about 0.5%.

Sixth, the presence of bromide tends to shift bleaching radiations to longer wavelengths and to decrease the total efficiency of the bleaching. It is normally desirable to have a sufficient amount of bromide in the glass to insure the existence of radiations of a neutral wavelength but not so much as to seriously impair bleaching. The optimum quantity of bromide in a particular glass depends upon several factors, including the overall composition of the glass, but, in general, varies between about 0.05–0.3% by weight as calculated from the batch. Since volatilization loss of bromide during melting of the glass batch can vary between about 50–75%, the amount of bromide retained in the glass normally ranges about 0.01–0.1%, by weight.

Seventh, increasing the mole ratio of silver to total halogen increases the efficiency of long wavelength bleaching but also extends the bleaching spectrum to shorter wavelengths, thereby making reading or probing by neutral wavelength radiations more difficult. The optimum mole ratio of silver to total halogen is approximately 1:4.

Eighth, copper can be added as a sensitizer to improve the darkening capability of the glass. Concentrations between about 0.01–0.1% by weight are particularly useful.

Ninth, arsenic oxide reduces the thermal fading rate of the glass somewhat and improves the darkening efficiency. However, large additions can cause reduction of the silver so the preferred concentrations are between about 0.05–0.5% by weight.

I have discovered that glasses exhibiting a refractive index higher than 1.52, such as to be effective as a core element of a fiber optic, and demonstrating very satisfactory photochromic properties can be secured from glasses in the preferred composition range of U.S. Pat. No. 3,208,860 to which about 10–50% by weight tantalum computed as $Ta_2O_5$, has been added. At the high additions of $Ta_2O_5$, $SiO_2$ and/or $Al_2O_3$ and/or $B_2O_3$ are replaced therewith. Thus, excluding the silver and halogen components, the glasses of my invention consist essentially, by weight on the oxide basis, of about 30–70% $SiO_2$, 0–26% $Al_2O_3$, 4–26% $B_2O_3$, 10–50% $Ta_2O_5$, and at least one alkali metal oxide selected from the group consisting of 2–8% $Li_2O$, 3–15% $Na_2O$, 6–20% $K_2O$, 8–25% $Rb_2O$, and 10–30% $Cs_2O$.

I have found that whereas the ratios of silica to alumina and silica to boric oxide need not be altered to retain some photochromism as the tantalum content is increased, some adjustments thereof can lead to improved photochromic behavior. Hence, in general, as the level of tantalum is increased, the ratios of both alumina to silica and boric oxide to silica must be lowered to optimize darkening sensitivity. Tantalum contents in excess of about 50% $Ta_2O_5$ appear to result in glasses lacking good photochromic properties.

In addition to the recited components of the base glass composition, other constituents such as MgO, CaO, BaO, SrO, ZnO, PbO, and $P_2O_5$ may be included therein. Whereas the abovelisted divalent metal oxides in low concentrations do not completely destroy the photochromic character of the glass, their presence should be limited because they are somewhat deleterious to the properties desired in information display devices and, further, they may lead to the development of other crystalline phases which would foster opacity of the glass. Therefore, individual amounts of each should be held below about 4% MgO, 6% CaO, 8% BaO, 7% SrO, 8% ZnO, and 10% PbO, with the total amount of all constituents in addition to the recited components of the base glass not exceeding about 15% by weight of the glass composition.

The preferred composition ranges for obtaining high refractive index glasses with good darkening sensitivity to ultraviolet radiations, show natural fading at room temperature, good bleaching sensitivity to red and infrared radiations, and good resistance to fading upon reading or probing with visible light are: 30–60% $SiO_2$, 0–12% $Al_2O_3$, 5–20% $B_2O_3$ 5–15% total alkali metal oxide, 10–35% $Ta_2O_5$, 0–1% F, 0.01–0.1% CuO, 0.2–0.6% Ag, 0.3–0.8% Cl, 0.14 0.3% Br, and 0–0.2% $As_2O_3$.

As has been explained above, the photochromism of these glasses is due to the presence of submicroscopic crystals of silver halides dispersed in the glassy matrix. These crystals can be precipitated out by cooling the melt relatively slowly, but more uniformly sized submicroscopic crystals are secured when the melt is cooled rapidly to a glass such that essentially no crystallites of silver halide are formed and then the glass is heated to a temperature above the strain point thereof for a sufficient length of time to cause the precipitation of the crystals within the glass in an amount of at least 0.005% by volume. Normally, temperatures in excess of the softening point of the glass are not employed in this crystallization step inasmuch as such treatment would cause deformation of the glass article. In general, temperatures about 550°–850° C. are useful in this practice for times of about ¼–8 hours. Higher tantalum levels normally require higher temperatures for heat treatment. The refractive index of the glass is essentially unchanged by the mode of heat treatment.

To insure the production of a transparent photochromic glass, the concentration of crystals should not exceed about 0.1% by volume and the size thereof should not exceed about 0.1 micron in diameter. In general, the minimum size of the crystals has been measured as being about 50–60 A. in diameter, whereas in the preferred product the crystals measure about 90–150 A. Where the analyzed concentrations of silver and halogens in the glass exceed about 0.7 and 0.6% by weight, respectively, a truly transparent glass cannot usually be produced.

The paramount requirement for fiber optics employed in information display devices is good image resolution. Good resolution requires a large difference in index of refraction between the core and cladding glass. For this reason, the higher the refractive index of the core glass, the more desirable will be the glass. U.S. Pat. No. 3,197,296 discloses photochromic glasses having indices of refraction between 1.52 and 1.54 utilizing narrowly defined proportions of BaO and PbO. However, I have found it possible to produce glasses exhibiting indices of refraction higher than 1.54, while maintaining good photochromic properties therein, only with the presence of tantalum. Hence, this effect of tantalum is the essence of my invention.

The glasses of this invention may be obtained by melting the batch ingredients in suitable proportions utilizing conventional melting techniques in crucibles, pots, or continuous tanks. Normally, the glass batch is melted at 1,300°–1,500° C. for about 4–8 hours. The melt is then formed into articles of a desired configuration through conventional glassworking techniques such as blowing, casting, drawing, pressing, or rolling which also concurrently cool the glass below its softening point (about 650°–750° C.). The shaped article may thereafter be cooled to room temperature for an examination of glass quality, with a conventional annealing step (450°–550° C.), or they may be merely cooled within the range of temperatures suitable for heat treatment and, after heat treatment, cooled to room temperature.

Table I records glass compositions, expressed in parts by weight on the oxide basis calculated from the batch, operable in the invention. The individual batch ingredients may comprise any materials, either oxides or other compounds, which, on being melted together are converted to the desired oxide composition in the proper proportions. It is preferred that some nitrates be used in the batch to prevent unwanted reduction of the silver. In accordance with conventional glass analytical practice, silver is reported as metallic silver, selenium as metallic selenium, and the halogens as halides.

The batches were melted in closed platinum crucibles at 1,300° C. for 6 hours and the melts then pressed into patties about 4×4×¼inches and annealed. The annealed patties were placed into an electrically fired furnace and heat-treated at the temperatures and for the times recited in table II to develop the desired silver halide crystals in the glass. The rate of heating the patties to the crystallization temperature and the rate of cooling the crystallized patties to room temperature are governed only by the resistance of the glass to thermal breakage. The heating and cooling rates appear to have little, if any, effect upon the photochromism of the glass, except in that slow rates effectively increase the time the glass is held at high temperatures. Table II also reports the index of refraction of each glass.

TABLE I

|  | 1 | 2 | 3 | 4 | 5 |
|---|---|---|---|---|---|
| $SiO_2$ | 55.0 | 52.0 | 48.2 | 49.5 | 46.8 |
| $Al_2O_3$ | 10.0 | 9.5 | 6.2 | 3.2 | 4.1 |
| $Li_2O$ | 3.4 | 3.2 | 2.8 | 2.9 | 2.9 |
| $Na_2O$ | 7.5 | 7.1 | 6.2 | 6.4 | 5.8 |
| $B_2O_3$ | 14.0 | 13.3 | 11.7 | 12.1 | 8.9 |
| F | 0.5 | 0.4 | 0.4 | 0.4 | 0.4 |
| CuO | 0.06 | 0.05 | 0.05 | 0.05 | 0.05 |
| Selenium | 0.02 | 0.02 | 0.04 | — | — |
| $K_2O$ | 0.04 | 0.04 | 0.03 | 0.03 | 0.03 |
| Ag | 0.4 | 0.4 | 0.4 | 0.4 | 0.4 |
| Cl | 0.6 | 0.5 | 0.5 | 0.5 | 0.5 |
| $As_2O_3$ | — | — | — | — | 0.1 |

|        | 5    |      |      |      |      |
|--------|------|------|------|------|------|
| $Ta_2O_5$ | 9.0  | 13.3 | 23.4 | 24.2 | 30.0 |
| Br     | —    | —    | —    | 0.15 | 0.05 |

|           | 6    | 7    | 8    | 9    |
|-----------|------|------|------|------|
| $SiO_2$   | 46.3 | 37.2 | 29.4 | 54.0 |
| $Al_2O_3$ | 1.3  | 1.0  | 0.81 | 9.0  |
| $Li_2O$   | 2.7  | 2.2  | 1.76 | —    |
| $Na_2O$   | 6.8  | 4.6  | 3.67 | 15.0 |
| $B_2O_3$  | 6.6  | 4.4  | 4.26 | 20.0 |
| F         | —    | —    | —    | —    |
| CuO       | 0.09 | 0.07 | 0.06 | 0.92 |
| Selenium  | —    | —    | —    | 0.2  |
| $K_2O$    | —    | —    | —    | —    |
| Ag        | 0.4  | 0.46 | 0.36 | 0.40 |
| Cl        | 0.5  | 0.46 | 0.36 | 0.40 |
| $As_2O_3$ | —    | —    | —    | —    |
| $Ta_2O_5$ | 36.1 | 50.5 | 60.0 | 20.0 |
| Br        | 0.13 | 0.08 | 0.08 | 0.20 |

TABLE II

| Example No. | Temperature Treatment | Hold Times | Refractive Index |
|-------------|----------------------|------------|------------------|
| 1 | 550° C. | 4 hours | 1.527 |
| 2 | 600° C. | 2 hours | 1.536 |
| 3 | 650° C. | 1 hour  | 1.564 |
| 4 | 650° C. | 1 hour  | 1.565 |
| 5 | 700° C. | 1 hour  | 1.585 |
| 6 | 750° C. | 1 hour  | 1.605 |
| 7 | 800° C. | 1 hour  | 1.669 |
| 8 | 800° C. | 1 hour  | 1.712 |
| 9 | 750° C. | 1 hour  | 1.539 |

To illustrate the extent of silver and halide volatilization (up to about 30 percent for the silver and about 30–75 percent for the halogens depending upon the melting temperature employed), chemical analyses were performed on two of the glasses resulting from the above batches. These analyzed compositions are set forth in table III in weight percent.

TABLE III

|           | 4      | 5      |
|-----------|--------|--------|
| $SiO_2$   | 51.62% | 47.37% |
| $Al_2O_3$ | 3.2    | 4.09   |
| $Li_2O$   | 2.91   | 2.91   |
| $Na_2O$   | 6.13   | 5.72   |
| $B_2O_3$  | 11.69  | 8.67   |
| F         | 0.43   | 0.35   |
| CuO       | 0.046  | 0.048  |
| $K_2O$    | 0.36   | 0.37   |
| Ag        | 0.32   | 0.33   |
| Cl        | 0.42   | 0.42   |
| $As_2O_3$ | —      | 0.12   |
| $Ta_2O_5$ | 23.48  | 29.7   |
| Br        | 0.058  | 0.017  |

The efficiency of the photochromic behavior of these glasses was tested by first exposing polished glass discs, having a 2-mm. thickness, to actinic radiations of about 3,500 A. The discs were then "read" by exposure to radiations of about 5,100 A. Finally, the discs were bleached by exposure to radiations of about 5,900 A. Table IV reports the effects observed. Thus $T_o$ represents the initial percent transmission of the glass; $T_A$ represents the percent transmission after exposure to 24 millijoules of the actinic radiation; $T_N$ represents the percent transmission after exposure to 2 joules of the nominally neutral radiation; and $T_B$ represents the percent transmission after exposure to 2 joules of the long wavelength bleaching radiation. $T_F$ is the percent transmission of the darkened glass after it has been kept in the dark for 10 minutes.

TABLE IV

| Example No. | $T_o$ | $T_A$ | $T_N$ | $T_B$ | $T_F$ |
|-------------|-------|-------|-------|-------|-------|
| 1 | 90 | 30 | 36 | 78 | 33 |
| 2 | 90 | 28 | 34 | 72 | 28 |
| 3 | 90 | 34 | 43 | 74 | 40 |
| 4 | 90 | 30 | 35 | 75 | 36 |
| 5 | 90 | 25 | 36 | 81 | 25 |
| 6 | 90 | 27 | 33 | 80 | 28 |
| 7 | 90 | slight darkening | | | |
| 8 | 90 | slight darkening | | | |
| 9 | 90 | 32 | 32 | 80 | 28 |

Example 6 is the preferred embodiment of the invention since the index of refraction is relatively high, providing a high NA, and the photochromic efficiency thereof is quite good as is its resistance to thermal fading and fading during reading or probing.

I claim:

1. A transparent photochromic glass having an index of refraction greater than 1.52 consisting essentially, by weight on the oxide basis as calculated from the batch, of about 30–76% $SiO_2$, 0–26% $Al_2O_3$, 4–26% $B_2O_3$, 10–50% $Ta_2O_5$, at least one alkali metal oxide selected from the group consisting of 2–8% $Li_2O$, 3–15% $Na_2O$, 6–20% $K_2O$, 8–25% $Rb_2O$ and 10–30% $Cs_2O$, at least one halogen selected from the group consisting of chlorine, bromine, and iodine in the indicated minimum effective proportion of 0.2 percent chlorine, 0.1 percent bromine, and 0.08 percent iodine, and a minimum of silver in the indicated proportion of 0.2 percent in a glass wherein the effective halogen is chlorine, 0.05 percent in a glass containing at least 0.1 percent bromine but less than 0.08 percent iodine, and 0.03 percent in a glass which contains at least 0.08 percent iodine.

2. A transparent photochromic glass according to claim 1 wherein the analyzed silver content in the glass is less than about 0.7 percent by weight and the analyzed total halogen content in the glass is less than about 0.6 percent by weight.

3. A transparent photochromic glass having an index of refraction greater than 1.52 consisting essentially, by weight on the oxide basis as calculated from the batch, of about 30–60% $SiO_2$, 0–12% $Al_2O_3$, 0–20 percent $B_2O_3$, 10–30% $Ta_2O_5$, 5–15% total of $Li_2O$, $Na_2O$, $K_2O$, $Rb_2O$, and $Cs_2O$, 0.3–0.8% Cl, 0–0.2% Br, 0.2–0.6% Ag, 0–1% F, 0.01–0.1% CuO, and 0–0.2% $As_2O_3$.

* * * * *

UNITED STATES PATENT OFFICE
CERTIFICATE OF CORRECTION

Patent No. 3,630,765                    Dated December 28, 1971

Inventor(s) Roger J. Araujo

It is certified that error appears in the above-identified patent and that said Letters Patent are hereby corrected as shown below:

Column 2, line 5, change "facing" to -- fading --.

Column 2, line 11, change "glass" to -- glassy --.

Column 3, line 18, change "30-70%" to -- 30-76% --.

Column 3, line 54, change "0.140.3% Br" to -- 0-0.3% Br --.

Column 5, Example 9, line 12, change "0.92" to -- 0.02 --.

Claim 3, line 57, change "0-20" to -- 5-20 --.

Signed and sealed this 5th day of December 1972.

(SEAL)
Attest:

EDWARD M. FLETCHER, JR.
Attesting Officer

ROBERT GOTTSCHALK
Commissioner of Patents